March 16, 1943. E. V. NYBERG 2,314,156
CONSECUTIVE NUMBERING MECHANISM FOR CALCULATING MACHINES
Filed Sept. 25, 1937 6 Sheets-Sheet 3

March 16, 1943.  E. V. NYBERG  2,314,156
CONSECUTIVE NUMBERING MECHANISM FOR CALCULATING MACHINES
Filed Sept. 25, 1937  6 Sheets-Sheet 4

March 16, 1943.  E. V. NYBERG  2,314,156
CONSECUTIVE NUMBERING MECHANISM FOR CALCULATING MACHINES
Filed Sept. 25, 1937  6 Sheets-Sheet 5

Inventor:
Ernst Vilhelm Nyberg,
By Potter, Pierce & Scheffler,
Attorneys.

March 16, 1943. E. V. NYBERG 2,314,156
CONSECUTIVE NUMBERING MECHANISM FOR CALCULATING MACHINES
Filed Sept. 25, 1937 6 Sheets-Sheet 6

Patented Mar. 16, 1943

2,314,156

UNITED STATES PATENT OFFICE 2,314,156

CONSECUTIVE NUMBERING MECHANISM FOR CALCULATING MACHINES

Ernst Vilhelm Nyberg, Stockholm, Sweden, assignor, by mesne assignments, to Ekonomiregister Inc., New York, N. Y., a corporation of New York Application September 25, 1937, Serial No. 165,775
In Germany September 28, 1936

1 Claim. (Cl. 235—60)

The present invention relates to apparatus and machines for accounting, book-keeping and balancing purposes and more particularly to a consecutive numbering mechanism to be used in apparatus and machines of this class.

The principal object of the invention is to provide an improved construction and control of the consecutive numbering mechanism of a machine of the class described.

Another object of the invention is to provide an improved consecutive numbering mechanism the indicating or printing device of which may be combined to one unit with one or more indicating or printing devices of the machine proper.

Another object of the invention is to provide an improved consecutive numbering mechanism the counter of which is common to a plurality of indicating or printing devices which, consequently, simultaneously are set on the consecutive number.

These and further objects will be apparent according as the following description proceeds reference being had to the accompanying drawings showing by way of example an accounting machine provided with a consecutive numbering mechanism according to the invention.

Although the invention only comprises the new consecutive numbering mechanism it is deemed necessary for the sake of completeness also to described the most important parts of the accounting machine proper to which this mechanism is applied.

Key board

In the embodiment shown (see especially Figs. 1 and 2) the key board comprises thirteen rows of keys 1 to 13, inclusive. Rows 1, 2 and 13 contain setting keys for selecting and setting the totalizers to effect different calculation operations, row 1 comprising five keys, viz. old balance key 20, plus entries key 22, minus entries key 24, sub-totaling key 26 and totaling key 28, row 2 three keys, viz. account numeral key 30 and two special keys 32 and 34, and row 13 nine totaling and sub-totaling keys designated by TA, TB, TC . . . TK, one key for each of the nine totalizers. The object of the keys 32, 34 and TA to TK, inclusive, will be fully described later on. Rows 3, 4 and 5 contain date keys 36 and rows 6 to 12, inclusive, amount keys 38.

Each of the keys rests on a vertical rod 40 (see especially Figs. 3, 4 and 7) actuated by a spring 42 and provided with two pins 44 and 46. All the keys of a row co-operate by their pins 44 with an inclined surface 48 on a stopping plate 50 rotatably mounted on a shaft 52 and actuated by a spring 54. Provided below the stopping plate 50 for each row of keys 36 and 38 is an actuator slide 56 having a shoulder 58. There may be similar actuator slides 56 also for the rows of setting keys 1, 2 and 13 when it is desired to indicate or record the depressed key as will be described later on. When the slide 56 is in starting position the shoulder 58 is disposed at a horizontal distance from the edge of the appurtenant plate 50 corresponding to one tooth for the purpose to be described later on.

Figure 5:
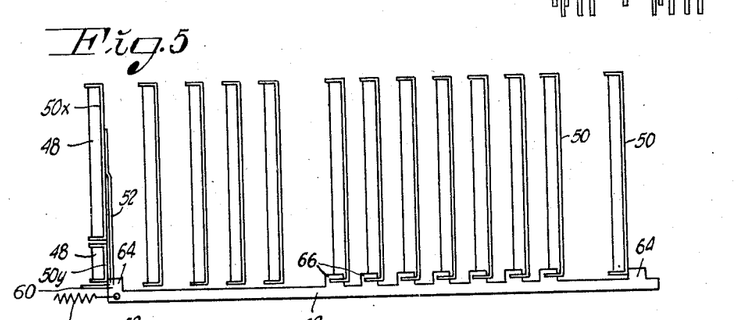
Figs. 5 and 6 are a plan view and a front view, respectively, of a locking mechanism for the keys.

All the stopping plates 50 are undivided except that of the row of keys furthest to the left which is divided into two parts 50x and 50y (see Figs. 5 and 6), the keys 20, 22 and 24 co-operating with the stopping plate 50x and the keys 26 and 28 with the stopping plate 50y. Secured to the pin 44 of the rod 40 of the key 28 is an angularly bent arm 60 extending behind the stopping plate 50y.

Extending transversely of the key board is a bar 62 having studs 64 engaging the right side of the stopping plate 50y of the row of keys furthest to the left and of the stopping plate 50 of the row of keys furthest to the right (see Fig. 5), as well as studs 66 engaging the left side of the stopping plates 50 of the amount keys 38. A spring 68 tends to keep the rod 62 with the studs 64 in engagement with the respective stopping plate 50.

The actuator slides 56 for the rows of date keys 36 may be locked by means of a locking rod 70 (see Fig. 3) provided right in front of and at a distance from the rear ends of said slides corresponding to one tooth. The rod 70 is rotatably mounted on a shaft 72, and a link 74 connects the rod with a bell-crank lever 76 which by means of a wire or wires 160 is connected with the account numeral key 30 and, possibly, also with one or more of the other setting keys in the manner to be described.

All the keys of each row co-operate by their pins 46 with hooks on a detent rod 82 suspended in arms 84 each fixed on a shaft 86 and 88, respectively. The detent rods 82 are movable in their longitudinal direction, a pin 90 on one arm 84 sliding in a slot 92 in the rod. A spring 94 tends to retain the rod 82 in engagement with a stopping bar 96.

Actuator mechanism

Figure 1:
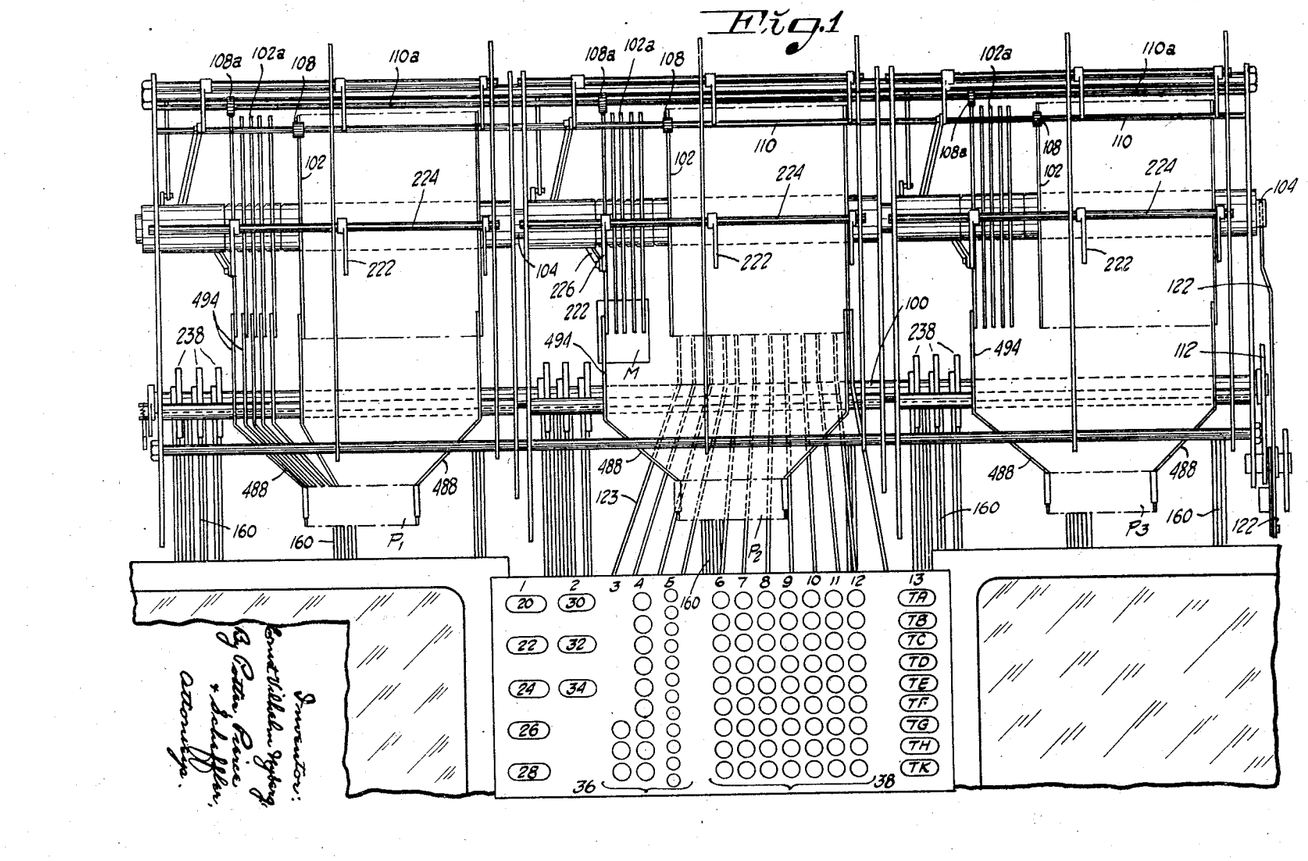
Fig. 1 is a diagrammatical top plan view of the machine showing the general arrangement thereof.

The actuator mechanism comprises a plurality of actuator wheels 102 rotatably mounted on a common shaft 104 and each actuated by a spring 106. As shown in Fig. 1, the machine comprises three substantially identical sections. The actuator wheels 102 of the central section are actuated directly from the key board as will be described later on, whereas the actuator wheels of the lateral sections are set by the influence of those of the central section in the following manner.

Permanently in mesh with each actuator wheel 102 is a pinion 108, 108' etc. and those pinions which correspond to actuator wheels of the same denomination of the three sections are fixed on one and the same shaft 110, 110' etc. Consequently, the setting of the actuator wheels of the central section will be compulsory transferred to the actuator wheels of the lateral sections which, thus, will be set in accordance with the setting of the key board.

The actuator is actuated by the main driving shaft 100 of the machine in the following manner. Secured on the shaft 100 is a cam disk 112, and riding on said cam disk is a roller 114 on an arm 116 rotatably mounted on a stud 118. A spring 120 tends to maintain the roller 114 in engagement with disk 112. At its free end arm 116 is pivotally connected to one end of a link 122 which is movable in its longitudinal direction. At its other end link 122 is mounted on a rod 124 connecting the lower ends of two arms 126 secured to the shaft 104 of the actuator wheels 102. Rod 124 extends through the three groups of actuator wheels locking said wheels normally by engaging spokes 128 thereof.

Setting of the actuator by the keys

The actuator slides 56 are each pivoted to a link 123 having a bent portion 125 pivoted to a pin 127 on the corresponding actuator wheel 102.

Figure 3:
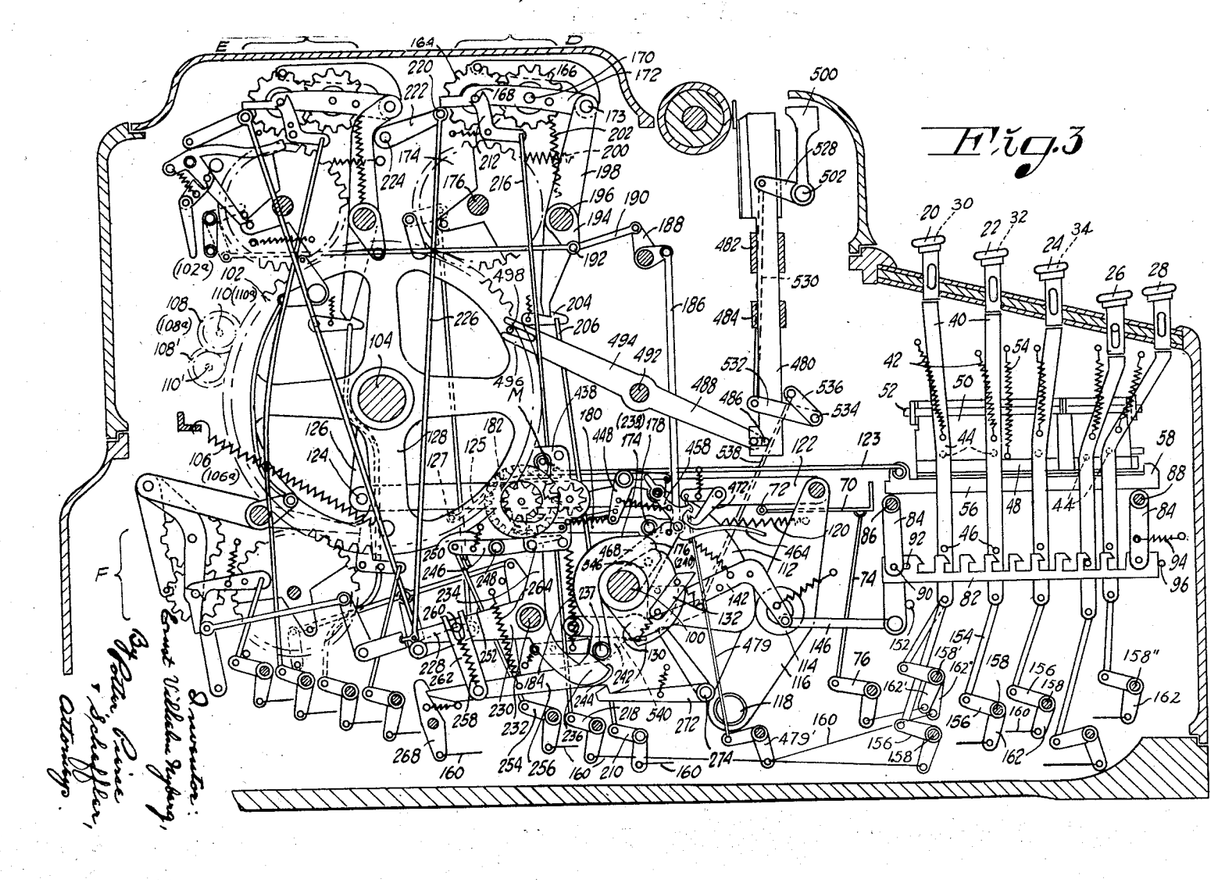
Fig. 3 is a partial sectional view of said central section on a somewhat enlarged scale.
Figure 4:
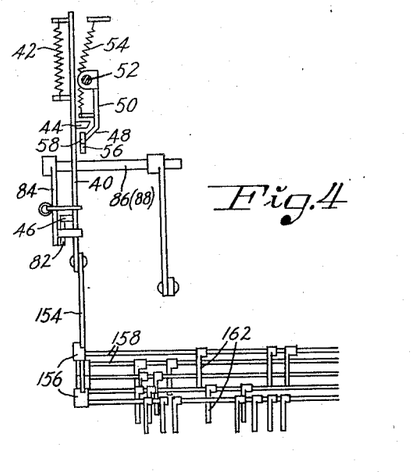
Fig. 4 is a partial end view of the key board.

When depressing an amount key 38—and also a date key 36 when the locking rod 70 has been turned downwardly in the manner to be described—pin 44 strikes the inclined surface 48 on the stopping plate 50 moving said plate in counter-clockwise direction as seen in Fig. 4. At the same time pin 46 forces the detent rod 82 towards the left in Figs. 3 and 7 causing the key rod 40 to be locked in depressed position by the pin 46 engaging a hook on the detent rod 82, when said rod is returned under the action of its spring 94. In Fig. 3, key 26 is shown in depressed position. When during the forward stroke the machine shaft 100 is rotated in clockwise direction (Fig. 3), arm 116 is rotated in opposite direction by the spring 120 and releases by link 122 the actuator wheels 102 from engagement by the stopping rod 124. Under the action of its spring 106 each actuator wheel 102 is thereby turned through an angle corresponding to the distance through which the corresponding actuator slide 56 is permitted to move to the left in Figs. 3 and 7. For a depressed key the rotation of the actuator wheel is determined by the movement of the actuator slide 56 into engagement with pin 44, whereas for a key which has not been depressed said rotation is determined by the shoulder 58 of the slide 56 abutting against the edge of the stopping plate 50. During the return stroke of the shaft 100 all actuator wheels 102 and, consequently, also the actuator slides 56 are returned to starting position by the action of the stop rod 124.

Automatic key release

Secured to the driving shaft 100 is a cam disk 130 (see Figs. 3 and 7) carrying a double-armed lever 132 rotatably mounted on a stud 134 on the disk and actuated by a spring 136 which tends to retain lever 132 in engagement with a stop 138 on the disk 130. Co-operating with the pointed end 140 of the lever 132 by its hook-shaped end 141 is a bell-crank lever 142 rotatably mounted on a stud 144, the other arm of said lever 142 being connected by means of a link 146 to the lower end of an arm 148 secured to shaft 86. A spring 150 tends to maintain lever 142 in starting position with arm 148 in engagement with a pin 152.

Figures 6, 7:
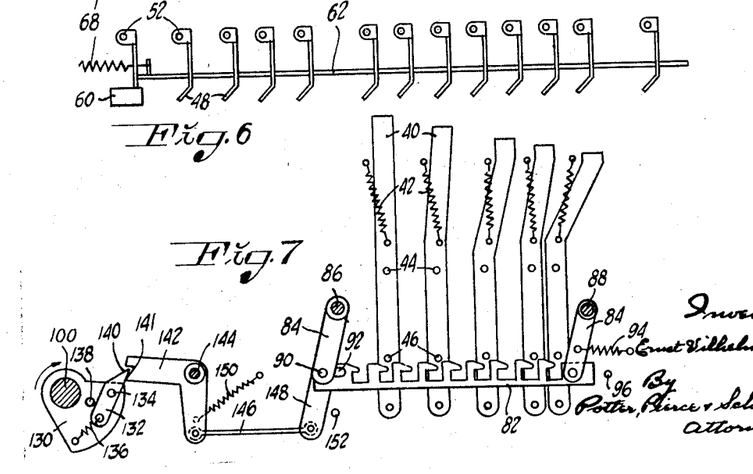
Fig. 7 is a partial lateral view of the key board showing the key release means.

The keys are returned into starting position in the following manner (see Figs. 3 and 7). When the main driving shaft 100 is rotated in clockwise direction lever 132 is rocked in the same direction past bell-crank lever 142 from the position shown in Fig. 3. The movement of the bell-crank lever 142 is stopped by the pin 152 causing the lever 132 to be rocked on its stud 134. When having passed bell-crank lever 142, lever 132 is returned into starting position by spring 136. On the return stroke of the driving shaft 100 lever 132 with its end 140 strikes the hook-shaped end 141 of bell-crank lever 142 rocking the latter in clockwise direction. By means of link 146 and arm 148 this movement is transmitted to the detent rods 82 which are moved to the left in Figs. 3 and 7 causing the pins 46 of the key rods 40 to be brought out of engagement with the hooks of said detent rods 82 and the keys to be returned into starting position by the action of their springs 42 (see Fig. 7). The positions of the levers 132 and 142 are such as to cause lever 132 on the continued rotation thereof to move out of engagement with the bell-crank lever 142 causing the latter to be returned into starting position by the action of its spring 150.

The totalizers

The three sections of the machine contain each three totalizers adapted to be selected and set for actuation by the setting keys, said totalizers being in the following referred to by reference numerals A, B, C of the left-hand section, D, E, F of the central section and G, H, K of the right-hand section. A link 154 engaging the lower end of each of the rods 40 of the setting keys (see Figs. 3 and 4) connects the rod to an arm 156 secured to a shaft 158. Secured to said shaft 158 are arms 162 corresponding in number to the number of functions which are to be performed when the key is depressed. These arms 162 are by means of wire or wires 160 connected with different members to perform these functions as will be described in the following.

Figure 8:
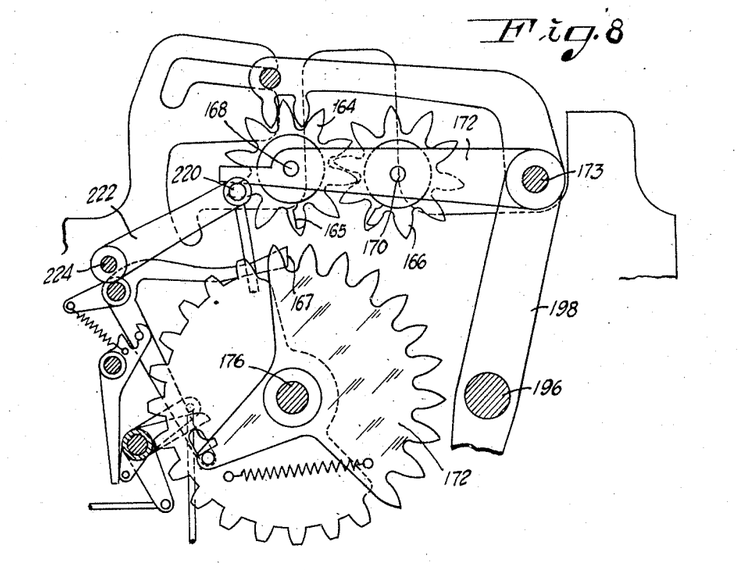
Fig. 8 is a lateral view of totalizer D of the central section on an enlarged scale.

Each totalizer comprises two groups of toothed wheels 164, 166 (see totalizer D in Figs. 3 and 8). The adding wheels 164 rotatably mounted on a common spindle 168 are permanently in mesh with the corresponding subtraction wheels 166 rotatably mounted on a common spindle 170 and stand normally at 0, while the subtraction wheels 166 normally stand at 9. The spindles 168, 170 are secured in a frame 172 movable on studs 173 in such manner as to bring the totalizer wheels 164, 166 alternatively into and out of engagement with a group of intermediate wheels 174 journalled on a common shaft 176 and permanently in mesh with the actuator wheels 102 so as to be set in accordance with the latter.

The totalizers are provided with ten transfer means which in the embodiment shown is applied to the intermediate wheels 174 as fully described in a pending application of Elis Magnus Magnusson, filed July 30, 1938, Ser. No. 222,244 for Letters Patent on Improvements in bookkeeping machines.

*Mechanisms for directing the totalizer D for addition, subtraction, total-taking and sub-total-taking*

Secured to the main driving shaft 100 (see Fig. 3) is a disk 174 having a peripheral projection 176, and co-operating with said projection is a roller 178 on a locking arm 180 rotatably mounted on a pin 182 and normally kept into engagement with the projection by a spring 184. Pivoted to the free end of arm 180 is a link 186 which by means of a bell-crank lever 188 and a link 190 is connected with a pin 192 on an arm 194 fixed to a shaft 196. Pin 192 is of such a length that it rests against the lateral surface of a double-armed lever 198 rotatably mounted on said shaft 196.

Lever 198 is pivoted to one of the pins 173 of the frame 172 and is actuated by a spring 200 which tends to turn the lever in counter-clockwise direction as seen in Fig. 3. A spring 202 connects the lever 198 with the frame 172. The other arm of the lever is normally locked by a spring-actuated pawl 204 which by a link 206 is connected with a bell-crank lever 210 which by means of wire or wires 160 is connected with one or more of the setting keys in the manner to be described.

Spindle 168 projects somewhat beyond the frame 172 and rests normally upon the one arm of a spring-actuated angular catch 212 the other arm of which is by a link 216 connected with a bell-crank lever 218 which by wire or wires 160 is connected with one or more of the setting keys in the manner to be described.

With its free end each of the arms of the frame 172 rests on a pin 220 at the one end of an arm 222 which is rotatably mounted on a shaft 224. Pivoted to one of the pins 220 is a link 226 which at its other end is pivoted to one arm 228 of an Y-shaped member 230 rotatably mounted on a shaft 232, the other arms of said member being designated by 234 and 236. It is to be observed that such an Y-shaped member 230 as well as actuating means therefor described in the following are provided for each totalizer.

Figure 13:
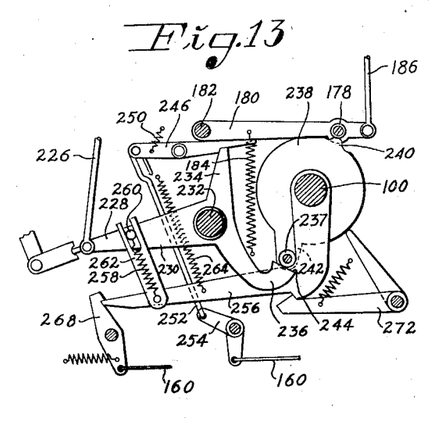
Fig. 13 is a sectional view of a portion of Fig. 3 showing certain of the details thereof to a larger scale.

The actuating means comprises a disk 238 having a projection 240 and an arm 242 (Fig. 13). In normal position the Y-shaped member 230 is locked by the following mechanisms. Arm 236 bears with an inclined surface 244 on a roller 237 journalled on arm 242 of disk 238. Arm 234 co-operates with a double-armed lever 246 pivoted on a pin 248. A spring 250 tends to keep one arm of said lever in locking engagement with arm 234, whereas the other arm of the lever by a link 252 is connected with a bell-crank lever 254 which by wire or wires 160 is connected with one or more of the setting keys as will be described later on. The Y-shaped member 230 is also controlled by a bell-crank lever 256 rotatably mounted on the driving shaft 100 and connected with arm 228 of said member by means of a spring 258 secured to said bell-crank lever 256 and to a pin 260 secured to arm 228 and engaging the fork-shaped end of a link 262 secured to the lever 256. A spring 264 tends to keep the lever 256 in such a position as to cause a surface on the lever to bear on the roller 237 on the disk 238. The bell-crank lever 256 is locked by a spring-actuated catch 268 engaging the one end of the lever and by wire or wires 160 connected with one or more of the setting keys in the manner to be described. Further the lever 256 is locked by one arm of a spring-actuated V-shaped pawl 272 rotatably mounted on a pin 274. The other end of said pawl 272 extends towards the periphery of the disk 238 and is adapted to be actuated by the projection 240 in the manner to be described.

*Consecutive numbering mechanisms*

Figure 2:
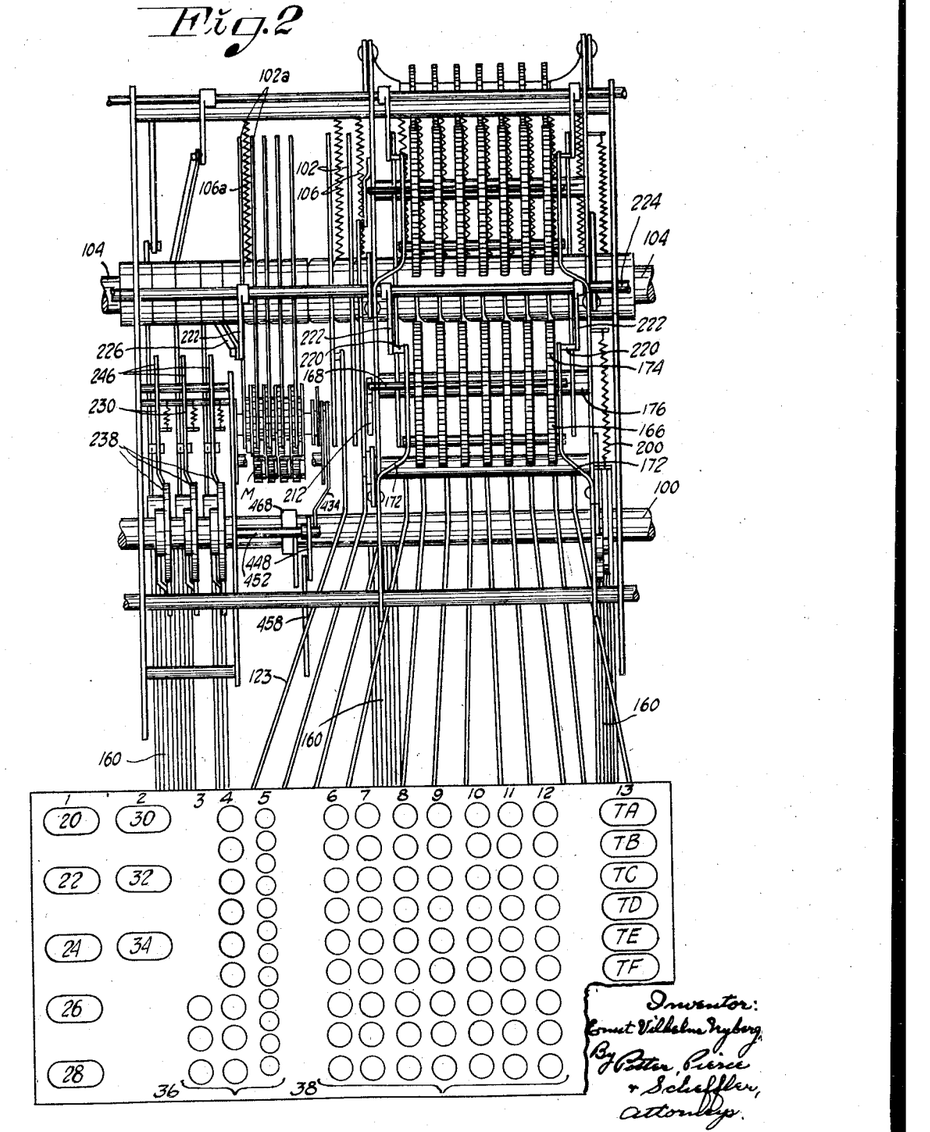
Fig. 2 is a top plan view of the central section of the machine.
Figure 9:
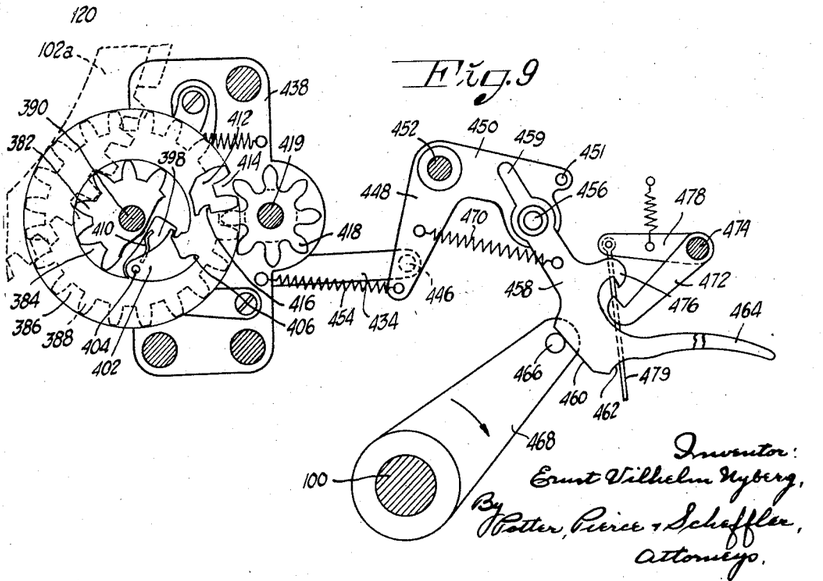
Fig. 9 is a lateral view of the consecutive numbering mechanism on an enlarged scale.
Figures 10, 11, 12:
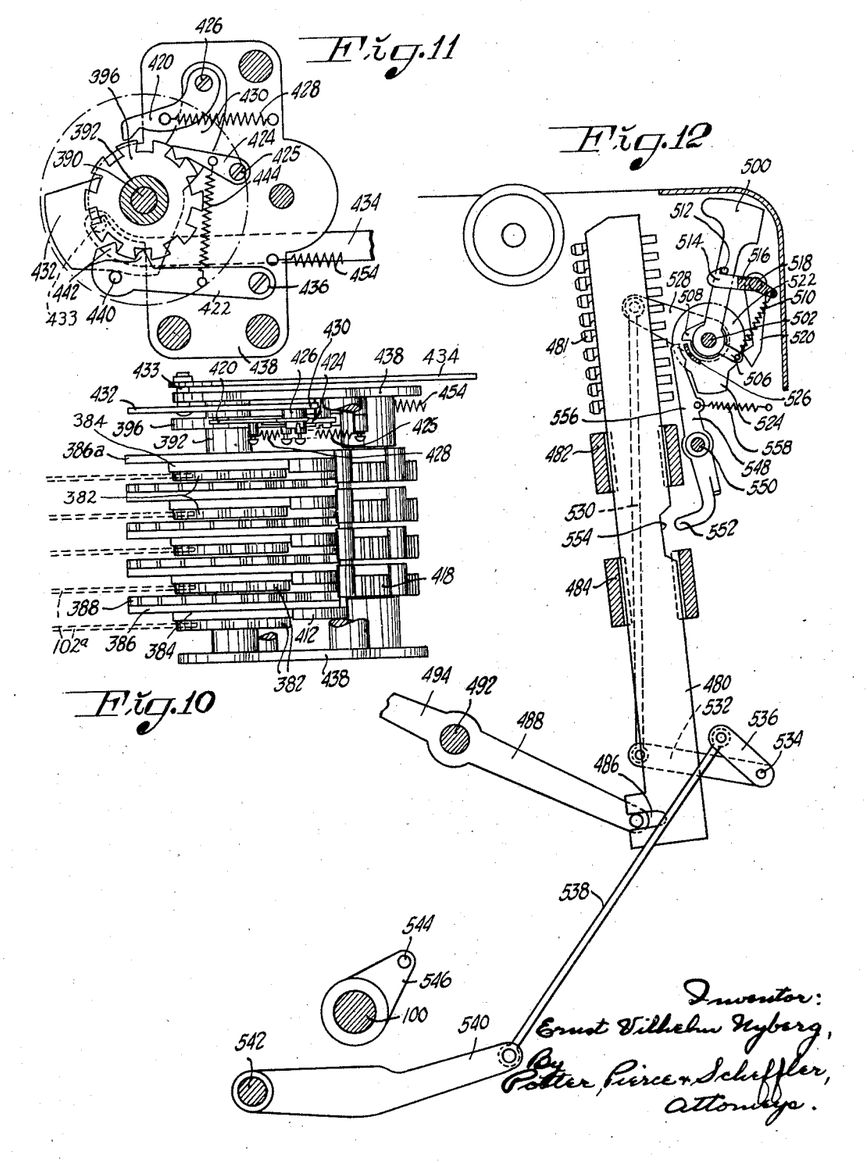
Fig. 10 is a top plan view of said mechanism.
Fig. 11 is a lateral view of the advancing means for said consecutive numbering mechanism.
Fig. 12 is a lateral view of the printing device on an enlarged scale.

The consecutive numbering mechanism is designated as a whole by M in Figs. 1, 2 and 3 and is shown in detail in Figs. 9, 10 and 11. Reckoned from the left to the right of the machine (from below and upwards in Fig. 10) there are provided for each denominational order a toothed wheel 382 permanently in mesh with an actuator wheel 102a, a disk 384 rigidly connected to wheel 382, another disk 386 and another toothed wheel 388 rigidly connected to disk 386, all said members being rotatably mounted on a common shaft 390. For the units denominational order there is no toothed wheel 388 (see Fig. 10), and moreover the disk 386a of this order is secured to a sleeve 392 mounted on shaft 390 and also carrying a feeding wheel 396 for advancing the consecutive numbering mechanism in the manner to be described.

Provided in each disk 384 is a peripheral recess 398 having an abutment 400 (see Fig. 9). Provided in the recess is a pawl 402 having substantially the same thickness as the disk 384 and being rotatably mounted on a pin 404 secured to the toothed wheel 382. The pawl has a tooth 406 and a projection 408. A spring 410 tends to keep the pawl with its projection 408 bearing on the abutment 400.

On its surface facing the disk 384 each disk 386 has a peripheral shoulder 412 forming the frame of a tooth space 414. The shoulder 412 has a recess 416 adapted to co-operate with the tooth 406 of the pawl 402. The disks 386 with their shoulders 412 and toothed wheels 388 constitute the consecutive numbering mechanism which hereinafter is called the numbering counter. This numbering counter comprises a toothed wheel 418 for each denominational order, said toothed wheels being rotatably mounted on a common shaft 419 and forming part of the tens transfer means of the numbering counter. Every second tooth of the wheel 418 has a recess permitting free passage of the disk 386, and these reduced teeth are situated in the same vertical plane as the shoulders 412 and can only be engaged by the tooth spaces 414. Further the toothed wheel 418 has such a width as to be in mesh with the toothed wheel 388 of the next higher denominational order.

The escapement mechanism for the numbering counter comprises an advancing pawl 420 and two locking pawls 422 and 424 (see Fig. 11), said pawls engaging the teeth of the advancing wheel 396 which is fixed to the sleeve 392 rigidly connected to the disk 386a of the units denominational order. The advancing pawl 420 is rotatably mounted on a pin 426 and kept in engagement with the advancing wheel 396 by a spring 428. The pin 426 is secured to the one arm 430 of a double-armed lever, which is rotatably mounted on shaft 390, the other arm 432 of said lever being by a pin 433 movably connected to a push rod 434. The locking pawl 422 is rotatably mounted on a pin 436 on the frame 438 of the mechanism and carries at its free end a pin 440 and two locking teeth 442 said latter normally embracing a tooth on the advancing wheel 396. In starting position the arm 432 bears on pin 440. Locking pawl 424 is pivoted on a stud 425 on the frame 438 and by a spring 444 connected with the locking pawl 422. The object of the locking pawl 424 is to ensure the escapement movement of the advancing wheel 396 being restricted to exactly one tooth for each operation.

The escapement mechanism is actuated by the main driving shaft 100 by the following mechanism (see Fig. 3 and especially Fig. 9). The push rod 434 is pivoted on a stud 446 on the one arm 448 of a bell-crank lever which is pivoted on a stud 452. A spring 454 connects this arm 448 with the frame 438. The other arm 450 of the bell-crank lever has a stud 456 on which is pivoted a guiding arm 458 which by a guiding surface 460, a recess 462 and a tongue 464 co-operates with a pin 466 at the free end of an arm 468 secured to the driving shaft 100. A spring 470 connects the guiding arm 458 with arm 448 connected with the push rod 434. The guiding arm 458 may be locked by a pawl 472 pivoted on a stud 474 and co-operating with a hook 476 on the arm 458. Pawl 472 is rigidly connected with a spring-actuated arm 478 pivoted on stud 474 and by a link 479 connected with a bell-crank lever 479' which by a wire 160 is connected with the account numeral key 30 (see Figs. 1 and 3).

As shown in Fig. 1 the actuator wheels 102a of the numbering counter are connected with similar actuator wheels of the lateral sections in the same manner as the actuator wheels 102 of the keys, thus by means of pinions 108a, 108a', etc., and shafts 110a, 110a'. Consequently, the setting of the mechanism is transferred to the actuator wheels 102a of the lateral sections and therefrom to printing devices in the manner to be described.

*Printing device*

As shown in Fig. 1 the machine is provided with three printing devices designated diagrammatically by P₁, P₂ and P₃, one for each section of the machine. In the embodiment shown each printing device comprises eighteen type rods corresponding to the thirteen rows of keys plus the five amount wheels of the numbering counter. The construction and control of the printing devices will be described with reference to one type carrier.

The type carrier 480 (see especially Fig. 12) is mounted in guides 482 and 484 to perform a substantially vertical reciprocating movement. Provided at the lower end of bar 480 is a recess 486, and engaging said recess with the end of one of its arms 488 is a double-armed lever rotatably mounted on a shaft 492. The other arm 494 of said lever (see Fig. 3) has a fork-shaped end 496 embracing a pin 498 on the corresponding actuator wheel 102 or 102a. Consequently on the operation of the machine those type carriers 480 which correspond to rows of keys containing a depressed key as well as those containing a printable digit are moved upwardly causing the types 481 corresponding to the setting of said actuator wheels 102 and 102a to be moved into printing position.

The hammer mechanism comprises hammers 500 journalled on a shaft 502. The hub of each hammer has an arm 506 and a projection 508 arranged diametrically to each other. Arm 506 is actuated by a spring 510 tending to move the hammer 500 in counter-clockwise direction. Further the hammer 500 is provided with a pin 512 co-operating with a pawl 514, all said pawls being fixed to a common locking bar 516 which is rotatably mounted on a shaft 518 and to which the springs 510 are secured. Connected with the locking bar 516 is an arm 520 riding on the edge of a disk 522 mounted on shaft 502 and provided with a projection 524. Secured to said shaft 502 is another disk of shape similar to that of the disk 522 and these two disks are connected by a bar 526. Shaft 502 carries also an arm 528 which by a link 530 is pivotally connected with an arm 532 secured to a stud 534. Fixed to this stud 534 is another arm 536 which by a link 538 is pivotally connected with an arm 540 rotatable on a stud 542, said arm 540 being adapted to be actuated and rotated in clockwise direction by a roller 544 on an arm 546 fixed to the driving shaft 100.

Levers 548 one for each type rod 480 are rotatably mounted on a shaft 550 and have their one arm formed as a hook 552 which in starting position of the type rod is right in front of a recess 554 in the rod, whereas the other arm 556 of the levers 548 is actuated by a spring 558 tending to rotate the lever in clockwise direction. The upper end of arm 556 is adapted to be turned below the projection 508 in order to lock the corresponding hammer 500.

*The operation of the numbering counter*

During the forward stroke of the machine the arm 468 fixed to the main shaft 100 is rotated in clockwise direction (Figs. 3 and 9). The pin 466 on this arm glides at first along the surface 460 of the arm 458 and thereafter leaves this arm 458 entirely, which thus will be turned in clockwise direction by the spring 470 until the projection 459 abuts the stud 451. The numbering counter, however, is not at all influenced by this movement of the arm 458.

During the return stroke of the machine the arm 468 is rotated in counter-clockwise direction during which rotation the pin 466 at first glides along the tongue 464 until it reaches the recess 462. During said gliding movement of the pin 466 along the tongue 464 the arm 458 is somewhat turned in counterclockwise direction, thereby tensioning the spring 470. It is to be observed in this connection that spring 454 is considerably stronger than spring 470. The arm 458 will then be pushed upwards and at the same time be turned in clockwise direction with respect to the bell-crank lever 448, 450 until the projection 459 abuts the stud 451. Pushing the arm 458 upwards results in rocking the bell-crank lever 448, 450, in counter-clockwise direction, whereby the rod 434 is drawn towards the right, as seen in Figures 3, 9 and 11. As a consequence thereof the double-armed lever 432, 430 (Figure 11) is rotated in counter-clockwise direction around the shaft 390, whereby the pawl 420 is caused to drop into the next-following recess of the advancing wheel 396 and to push this wheel one step further in counter-clockwise direction, so that the units wheel of the numbering counter is now advanced one step. The engagement of pin 466 with recess 462 is maintained until on further rotation of the arm 468 the pin 466 glides out of the recess 462 causing the arm 458 to swing in counter-clockwise direction and the lever 448, 450 to swing in clockwise direction and to return to starting position under action of spring 454, thereby moving the rod 434 to the left to the initial position shown in Figures 3, 9 and 11.

The above description thus discloses that the numbering counter is advanced one step at the end of the return stroke of the machine under the supposition that the hook 476 on the arm 458 is released from the locking pawl 472 as shown in Figure 9. When the hook 476 is in engagement with the locking pawl 472, as shown in Figure 3, the numbering counter will not be advanced, inasmuch as the pin 466 on the arm 468 only glides along the surface 460 without being able to reach the recess 462 and therefore the mechanism of the numbering counter will remain stationary.

The machine provided with such a numbering counter may be utilized to print records, for instance on an account card inserted in front of the printing device P1, a voucher, a receipt or the like inserted in front of the printing device P2 and a detail strip travelling around a platen in front of the printing device P3. Although the accounting machine shown is capable of performing very complicated calculations, the operation of the new numbering counter will be described in connection with a simple example corresponding to the above said functions of the setting keys. It should be observed, however, that this example and the function of the keys as well as of the totalizers as described above and later on is merely illustrative.

As an example of utilizing the machine as illustrated in the drawings the nine totalizers of the machine are assumed to serve the following purposes. The machine might be installed at the office of a business concern having a number of shops to which goods are delivered from the chief office. These goods must be accounted for by the shops and further the chief office is desirous to know the result of the sales by the various shops and also the sales of the various articles. For this reason the totalizer A is utilized for debit entries of a certain shop. The totalizer B is utilized for all debit entries of a certain article. The totalizer C is utilized for all credit entries of a shop. The totalizer E is utilized for all credit entries of a certain article. The totalizer F shows the grand total of all debit entries. The totalizer H shows the grand total of all credit entries. The totalizers G and K are intended for special accounts, such as cash payments, and the totalizer D is an add-and-subtract transaction totalizer.

It is assumed that on September the 3rd one of the shops whose account number is 1455 and whose debit balance amounts to $50.25 returns goods of the value of $25.00. Further the numbering counter might stand at 2059 at the beginning of the bookkeeping transaction.

The machine will now be operated in the following manner. The old debit balance, viz., $50.25, is first set up by the amount keys 38 and then key 20 representing "old balance" is depressed. The manoeuvring shaft 158 of this key has an arm 162 connected by a wire 160 with the bell-crank lever 218 controlling the totalizer D. By depressing the key the lever 218 is rocked in clockwise direction causing link 216 to draw catch 212 out of engagement with the end of spindle 168. However, the totalizer D is still maintained in raised position by the ends of the frame 172 resting on the pins 220 (see Figs. 3 and 8).

When at the beginning of the forward stroke of the machine driving shaft 100 is rotated in clockwise direction, roller 237 leaves the inclined surface 244 of arm 236 of Y-shaped member 230. However, this member is still locked by the locking arm 246 (Fig. 13). Immediately afterwards projection 240 on disk 238 releases locking rod 180 which by spring 184 is rocked in clockwise direction causing link 186 to be moved downwardly and pin 192 to release lever 198, said lever being still locked by pawl 204. The totalizer is still in its raised position by the frame 172 resting on pin 220.

When during the forward stroke the actuator wheels 102 are set in the manner above described the corresponding type carriers 480 are set by the levers 494, 488 so that types corresponding to the amount $50.25 are moved into printing position. During the rotation of the shaft 100 (see especially Fig. 12) roller 544 on arm 546 is turned into engagement with lever 540 rocking same in clockwise direction. This movement is transferred by the linkage 538, 536, 532 and 530 to arm 528 which together with shaft 502 is rocked in counter-clockwise direction. Consequently the disks 522 with the bar 526 are also rotated in the same direction and the bar 526 releases all pawls 508, but the hammers 500 are still locked by pawls 514. After continued rotation of bar 526 levers 548 are also released. For all such type carriers 480 which have not been actuated this results in the levers 548 with their upper arms 556 being turned beneath the corresponding pawls 508 under the action of springs 558, the lower arms 552 of the levers 548 engaging the recesses 554 in the type carriers 480. This results in such hammers 500 being locked. On the contrary for such carriers 480 which correspond to actuated actuator wheels 102 and, thus, have been moved upwardly this rocking of levers 548 is prevented by the recesses 554 in the type carriers no longer lying right in front of arms 552. Consequently, the hammers 500 of these type carriers are not locked by levers 548. When on continued rotation of shaft 502 cam 524 strikes arm 520, locking bar 516 is rocked in counter-clockwise direction causing the hammers 500 to be released from their engagement by the pawls 514. Such hammers 500 which are not locked by levers 548 are now wholly free and turned by springs 510 in counter-clockwise direction striking the types 481 which are in printing position. In this case the amount 50.25 is printed at the three printing places P1, P2 and P3. During the return stroke of the machine the different parts are returned to starting position in a manner which ought to be self-explaining.

At the end of the forward stroke the free end of the locking lever 246 (Figs. 3 and 13) is lifted by roller 237 releasing the Y-shaped member 230 which is rocked in counter-clockwise direction under the action of spring 258. Thereby link 226 is drawn downwardly so that totalizer D loses its support on pin 220. Under the action of spring 202 totalizer is lowered with its adding wheels 164 into engagement with the intermediate wheels 174. During the return stroke of the machine the adding wheels 164 are turned in counter-clockwise direction so that the amount $50.25 transferred to the intermediate wheels 174 during the forward stroke in the above described manner is transferred to the adding wheels 164.

During the last portion of the return stroke roller 237 strikes the inclined surface 244 of the Y-shaped member 230 rocking same in clockwise direction whereby link 226 again raises totalizer D out of engagement with the intermediate wheels 174. Then the projection 240 on disk 238 strikes roller 178 on locking arm 180 returning pin 192 into engagement with lever 198.

During this first full stroke of the machine the numbering counter M was not actuated as lever 458 was locked by pawl 472. Thus, this mechanism still contains number 2059.

Then date of the day and the numeral of the customer's account are recorded and simultaneously the numbering counter set into function.

The date of the day, viz. 3.IX, is set up by the date keys 36 and the account numeral of the customer, viz. 1455, is set up by the amount keys 38. Then key 30 is depressed. The manoeuvring shaft 158' of this key has two arms 162' and 162 connected by wires 160 i. e., one arm 162' with lever 76 controlling the locking rod 70 and the other arm 162 with the bell-crank lever 479' controlling the numbering counter, the depression of the key 30 resulting in lever 70 being turned downwardly out of the path of the actuator slides 56 of the row of date keys 36 and lever 458 being released from its engagement by pawl 472.

Fig. 3 shows the parts before key 30 is depressed, while Fig. 9 shows the parts 472, 478 after key 30 has been operated.

When during the forward stroke of the machine shaft 100 the actuator wheels 102a (Fig. 3) are released and under the action of their springs 106a rotated in clockwise direction the toothed wheels 382 (Fig. 9) of the setting means of the numbering counter are rotated in counter-clockwise direction. The angle of rotation of the wheels 382 and, thus, the upward movement of the corresponding type carriers 480 is determined by the angular displacement of the teeth 406, on pawls 402 carried by the wheels 382, from their normal positions as shown in Fig. 9 to the projecting shoulders 412 of the several disks 386. The angular displacement of the several disks 386 of the consecutive counter, as represented by the location of their shoulders 412, is fixed in accordance with the number registered by the consecutive numbering mechanism since all disks 386 are interconnected through the toothed wheels 418 to the locked feeding wheel 396.

It is to be observed that in starting position the angular distance between the tooth 406 and the recess 416 in the shoulder 412 corresponds to one tooth of the gear wheel 382. Consequently, according to the above example, gear wheel 382 of the units denominational order is turned ten teeth, that of the tens order six teeth, that of the hundreds order one tooth and that of the thousands order three teeth resulting in the corresponding actuator wheels 102a being turned through corresponding angles and the type carriers 480 to be moved upwardly through such distances that the types of the number 2059 are in printing position.

At the end of the forward stroke the following data will, consequently, be printed at the three printing places, viz. "2059 3.IX 1455," designating that the business transaction under consideration has the consecutive number 2059, is performed on September 3rd, and concerns the customer's account 1455.

When as in the example given disk 386a of the units denominational order stands on 9 shoulder 412 on said disk is right in front of corresponding toothed wheel 418. During the escapement movement described above said shoulder 412 strikes one of the teeth of said wheel provided with a recess and on its continued rotation it turns this wheel through an angle corresponding to two teeth (disks 386 have a diameter equal to twice that of wheels 382) so that the next tooth space of wheel 418 between teeth without recess is right in front of disk 386a. At the same time as the toothed wheel 418 of the units denominational order is turned two teeth, the toothed wheel 388 of the tens denominational order which is in mesh with said wheel 418 and consequently also disk 386 rigidly connected with wheel 388 are turned two teeth whereby tens transfer is effected. Now the numbering counter stands at 2060 which number will be printed when the account numeral key 30 is depressed the next time.

It should be observed that the numbering counter, viz. disks 386 as well as toothed wheels 388 remain in set position, whereas wheels 382 and toothed wheels 384 which represent the setting means of the mechanism are returned to starting position simultaneously with the type carriers 480 and the actuator wheels 102a. This involves advantages in safety and simplicity over mechanisms of this class in which the setting members of the printing means are brought into and out of engagement with the toothed wheels of the counter which must be zeroized each time to set the printing means and then again set on the registered number.

The next cycle of operation of the business transaction is to place an amount of $25.— to the credit of the account 1455. This amount is recorded in decreasing sense in totalizer D and in increasing sense in totalizer C (credit entries), E (special credit entries) and F (grand total of debit entries).

The amount is set up by the amount keys 38 and then key 24 (credit entries) is depressed. The manoeuvring shaft 158 of this key has arms 162 connected by wires 160 with adding levers 218 of the totalizers C, E and F and also an arm 162 connected with the subtracting lever 210 of totalizer D. The setting of the totalizers C, E and F for addition and the transfer of the amount to said totalizers take place in the same manner as described above with reference to totalizer D which in this case is set for subtraction in the following manner.

When key 24 is depressed lever 210 is rocked in counter-clockwise direction whereby link 206 draws pawl 204 out of engagement with lever 198. When being released by pin 192 in the manner described said lever 198 is rocked in counter-clockwise direction about its shaft 196 under the action of spring 200 causing the totalizer D to be swung in the same direction through such an angle that the subtraction wheels 166 are moved into correct position of engagement above the intermediate wheels 174. On account of this swinging motion frame 172 is disengaged from catch 212 but the totalizer is still in raised position by the engagement of the frame 172 by pin 220.

When at the end of the forward stroke locking arm 246 is released and the totalizer loses its support on pin 220 the subtraction wheels 166 of the totalizer D are brought into engagement with the intermediate wheels 174 and during the return stroke the amount $25.— is transferred to said totalizer in decreasing sense.

The amount $25.— is printed at the three printing places as described above, a suitable sign being simultaneously printed to designate that the entry concerns key 24, e. g. c (credit).

After the third cycle of operation the totalizers C, E and F contain an amount of $25.—and totalizer D an amount of $25.25.

In order to clear the machine for the next transaction a total has now to be taken from totalizer D. When taking a total the totalizer must be brought into engagement with the intermediate wheels 174 immediately at the beginning of the forward stroke. For said purpose key 28 is depressed. The manoeuvring shaft 158" of this key has arms 162 connected with lever 254 and catch 268. The depression of the key 28 results in the lever 254 being rocked in counter-clockwise direction causing arm 246 to be rocked in the same direction, so that arm 234 of the Y-shaped member 230 is released from said catch 246. The Y-shaped member 230 would now be free to rotate, were it not prevented to do so by the roller 237. By depression of key 28 further catch 268 is brought out of engagement with the locking lever 256 for the purpose to be described presently.

At the beginning of the forward stroke of the main shaft 100 roller 237 leaves the inclined surface 244 of arm 236 so that the Y-shaped member 230 is free to swing in counter-clockwise direction whereby link 226 disengages totalizer D which with its adding wheels 164 is brought into engagement with the intermediate wheels 174. On continued movement of the driving shaft 100 lever 116 is turned in counter-clockwise direction by spring 120, the roller 114 riding on cam 112, the shape of which determines the motion of the system. The stopping rod 124 is moved to the left in Fig. 3 releasing the actuator wheels 102 which tend to turn in clockwise direction under the action of their springs 106. In this case also the adding wheels 164 of the totalizer D are turned, but their rotation is limited by the abutment 165 striking the hook 167 (see Fig. 8). In the example given the amount 25.25 is in this manner transferred to the intermediate wheels 174 and from them to the actuator wheels and the type carriers and then printed at the three printing places as above described.

Immediately when the adding wheels 164 stand at 0 and, consequently, the amount 25.25 has been transferred to the printing devices and printed, the projection 240 on disk 238 strikes the V-shaped pawl 272 which disengages the locking lever 256.

This lever 256 is rocked by spring 264 in clockwise direction and through the intermediary of link 262 the Y-shaped member 230 is also rocked in clockwise direction lifting the totalizer D out of engagement with the intermediate wheels 174. As this takes place exactly when the adding wheels 164 have been brought to starting position, the totalizer D will be zeroized at the end of the stroke.

If instead of a total a sub-total is to be taken from the totalizer D, then key 26 is depressed. The manoeuvring shaft 158 or key 26 has an arm connected by a wire 160 with lever 254. The operation during the forward stroke of the main shaft 100 will now be the same as explained above in connection with taking a total. At the end of the forward stroke, however, the Y-shaped member 230 is still locked by catch 268 so that the totalizer D remains in engagement with the intermediate wheels also during the return stroke causing the amount 25.25 to be again transferred to the adding wheels thereof.

When the old balance is increased instead of decreased as in the above example, key 22 is depressed. The manoeuvring shaft 158 of this key carries arms 162 connected by wires 160 with adding levers 218 of totalizer A (debit entries), B (special debit entries), D (transaction totalizer), and H (grand total of all credit entries).

In taking totals and sub-totals it is necessary to move the stopping plates 50 out of the path of the actuator slides 56 of the amount keys 38 so as to permit an unchecked passage of the latter. On depressing key 26 or key 28 the stopping plate 50y is turned causing the transverse rod 62 to be moved to the right in Figs. 5 and 6 whereby the studs 66 on said rod turn the stopping plates 50 of the amount keys 38 out of the path of the slides 56. It should be observed that a depression of a key of the row of keys 13 results in the same turning of said stopping plates 50.

The nine total and sub-total keys of the row of keys 13 control each one of the nine totalizers. The operation of these keys ought to be self-explaining with reference to the above description of taking total and sub-total from totalizer D.

What I claim is:

In a machine of the class described, having actuators and a counter, said counter having wheels all on the same shaft and interspersed between said actuators, which actuators are also on a single shaft, each counter having a stop projecting therefrom, a separate gear on said counter shaft meshing with each said actuator, an outwardly projecting spring pressed stop projecting from each gear into the path of the associated counter wheel stop, operating means for actuating said actuators and thereby said gears to rotate said gear stop against the stop on the associated counter wheel to set said actuators at the amount standing on said counter wheels.

ERNST VILHELM NYBERG.